(12) United States Patent
Lawler et al.

(10) Patent No.: US 7,406,905 B2
(45) Date of Patent: Aug. 5, 2008

(54) SYSTEM FOR DRIVING A WIRE LOOP CUTTING ELEMENT

(75) Inventors: Kinton Lawler, Fulshear, TX (US); John Davis, Magnolia, TX (US); Michael Piecyk, The Woodlands, TX (US)

(73) Assignee: Oceaneering International, Inc, Houston, TX (US)

( * ) Notice: Subject to any disclaimer, the term of this patent is extended or adjusted under 35 U.S.C. 154(b) by 69 days.

(21) Appl. No.: 11/495,308

(22) Filed: Jul. 28, 2006

(65) Prior Publication Data

US 2008/0022830 A1   Jan. 31, 2008

(51) Int. Cl.
*B26D 1/44* (2006.01)
(52) U.S. Cl. ............... 83/651.1; 125/21; 83/816; 451/296
(58) Field of Classification Search ........... 83/200.1, 83/651.1, 788, 792, 809, 814, 816, 818–819, 83/794–795; 125/21; 166/361; 451/296, 451/355; 405/156
See application file for complete search history.

(56) References Cited

U.S. PATENT DOCUMENTS

| | | | |
|---|---|---|---|
| 3,376,907 A | 4/1968 | McNeal | |
| 3,479,830 A | 11/1969 | Ostarly | |
| 3,599,623 A * | 8/1971 | Phy | 125/11.01 |
| 3,667,515 A | 6/1972 | Corey | |
| 4,109,480 A | 8/1978 | Sumner | |
| 4,143,862 A | 3/1979 | Krieg | |
| 4,160,439 A * | 7/1979 | Piat | 125/16.01 |
| 4,168,729 A | 9/1979 | Tausig et al. | |
| 4,180,047 A | 12/1979 | Bertelson | |
| 4,464,964 A * | 8/1984 | Alexander | 83/830 |
| 4,967,725 A * | 11/1990 | Hinzen | 125/21 |
| 5,042,959 A | 8/1991 | Tadatsu | |
| 5,361,748 A * | 11/1994 | Matteucci | 125/21 |
| 5,363,558 A * | 11/1994 | Schroeder | 30/380 |
| 5,458,439 A | 10/1995 | Hall et al. | |
| 5,524,517 A * | 6/1996 | Robinson | 83/651.1 |
| 5,868,182 A | 2/1999 | Burton | |
| 6,237,585 B1 * | 5/2001 | Oishi et al. | 125/16.02 |
| 6,267,037 B1 | 7/2001 | McCoy, Jr. et al. | |
| 6,789,587 B2 | 9/2004 | Mossman et al. | |
| 7,036,599 B2 | 5/2006 | Matteucci | |

* cited by examiner

*Primary Examiner*—Jason Prone
*Assistant Examiner*—Joseph Defrank
(74) *Attorney, Agent, or Firm*—Duane Morris LLP

(57) ABSTRACT

This invention is directed toward a system for driving a wire loop cutting element. More particularly, the disclosed invention employs a frame and pulleys to drive a wire loop cutting element.

20 Claims, 6 Drawing Sheets

FIG. 1a  FIG. 1b

SYSTEM FOR DRIVING A WIRE LOOP CUTTING ELEMENT

FIELD OF THE INVENTION

This invention is directed toward a system for driving a wire loop cutting element. More particularly, the disclosed invention employs a frame and pulleys to drive a wire loop cutting element.

BACKGROUND OF THE INVENTION

Prior art systems exist for cutting subsea structures. One such system is disclosed in U.S. Pat. No. 5,361,748 to Matteucci. Prior art cutting systems have employed multiple component cutting means comprising pulleys, a cutting blade and related structure, which must move so as to traverse the diameter of the object to be cut. The movement of such multiple component cutting means is often cumbersome and requires significant clearance on multiple sides of the object to be cut.

The present invention overcomes such drawbacks by providing a cutting system wherein traversal of the diameter of the object to be cut by a multiple component cutting means is not required.

DESCRIPTION OF THE DRAWINGS

FIG. 1a is a top view of an embodiment of the invention during the initial phase of a cutting operation.

FIG. 1b is a top view of an embodiment of the invention during the middle phase of a cutting operation.

DESCRIPTION OF THE PREFERRED EMBODIMENTS

Figure 1C:
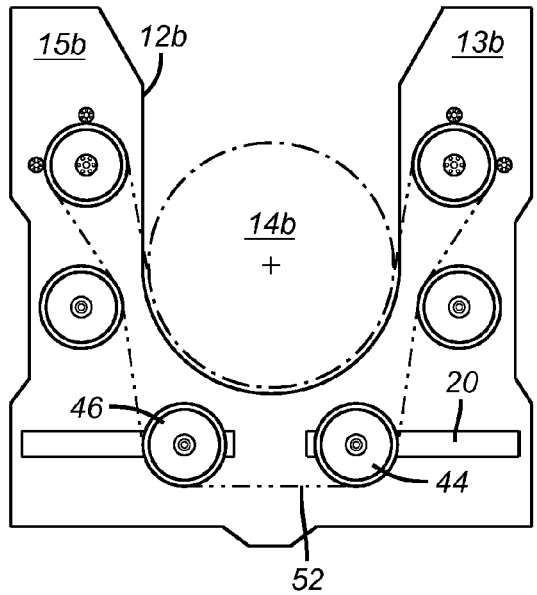
FIG. 1c is a top view of an embodiment of the invention during the final phase of a cutting operation.
Figure 1C:
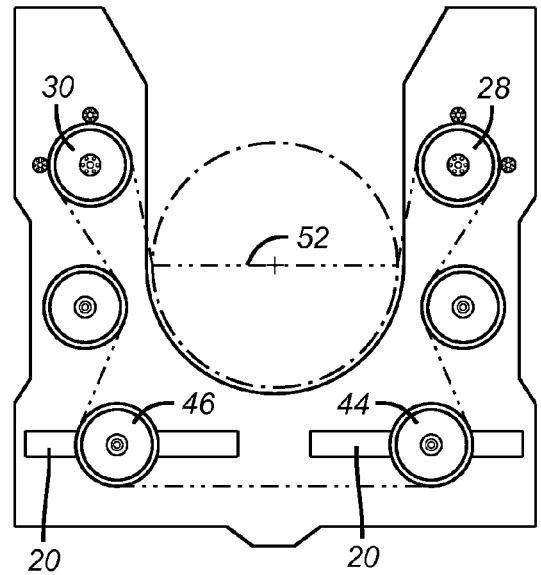
Figure 1C:
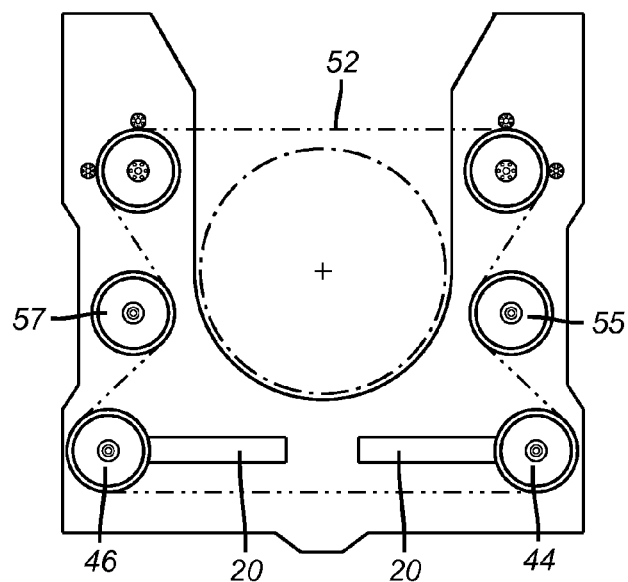
Figure 2A:
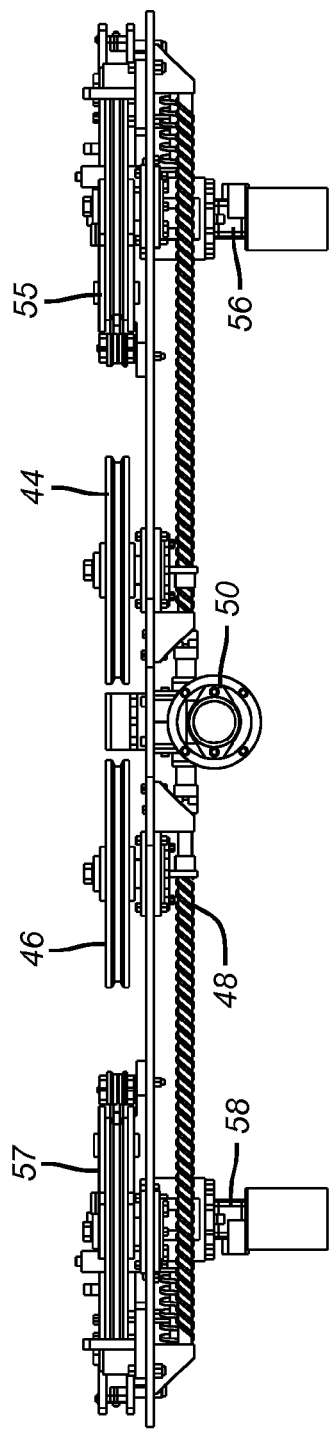
FIG. 2a is a rear view of the present invention with the pulleys in the retracted position.
Figure 2B:
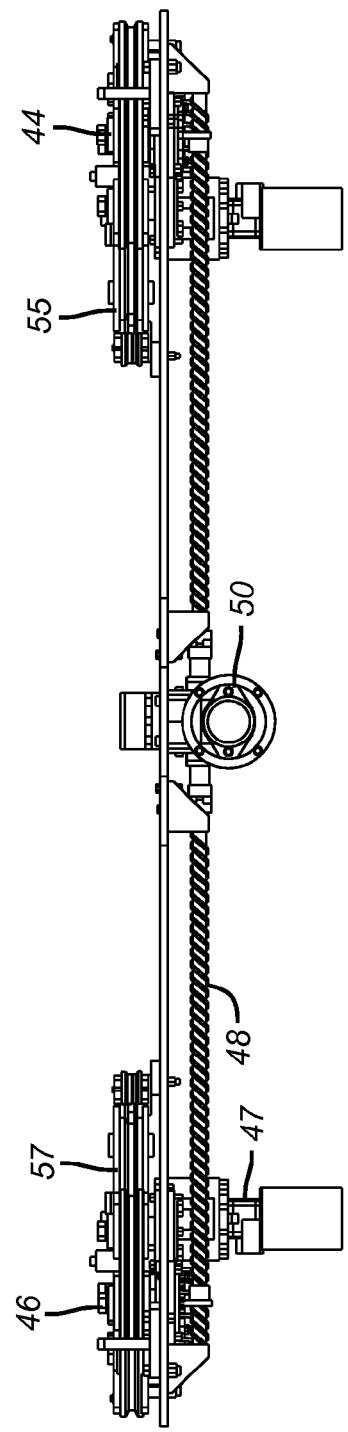
FIG. 2b is a rear view of the present invention with the pulleys in the extended position.

As shown in FIGS. 1a-1c and 3, a first preferred embodiment of the invention comprises a frame 10 comprising a lower plate 12a comprising right arm 13a and left arm 15a defining a lower central gripping region 14a. The frame further comprises a bracket 16 connected to the lower plate, and an upper plate 12b connected to the bracket. The upper plate comprises two pulley slots 20, a right arm 13b comprising a first drive wheel axle opening 22, and a left arm 15b opposite the right arm, comprising a second drive wheel axle opening 24. The right and left arms define an upper central gripping region 14b in substantial longitudinal alignment with the lower central gripping region, as shown in FIG. 1a.

Figure 3:
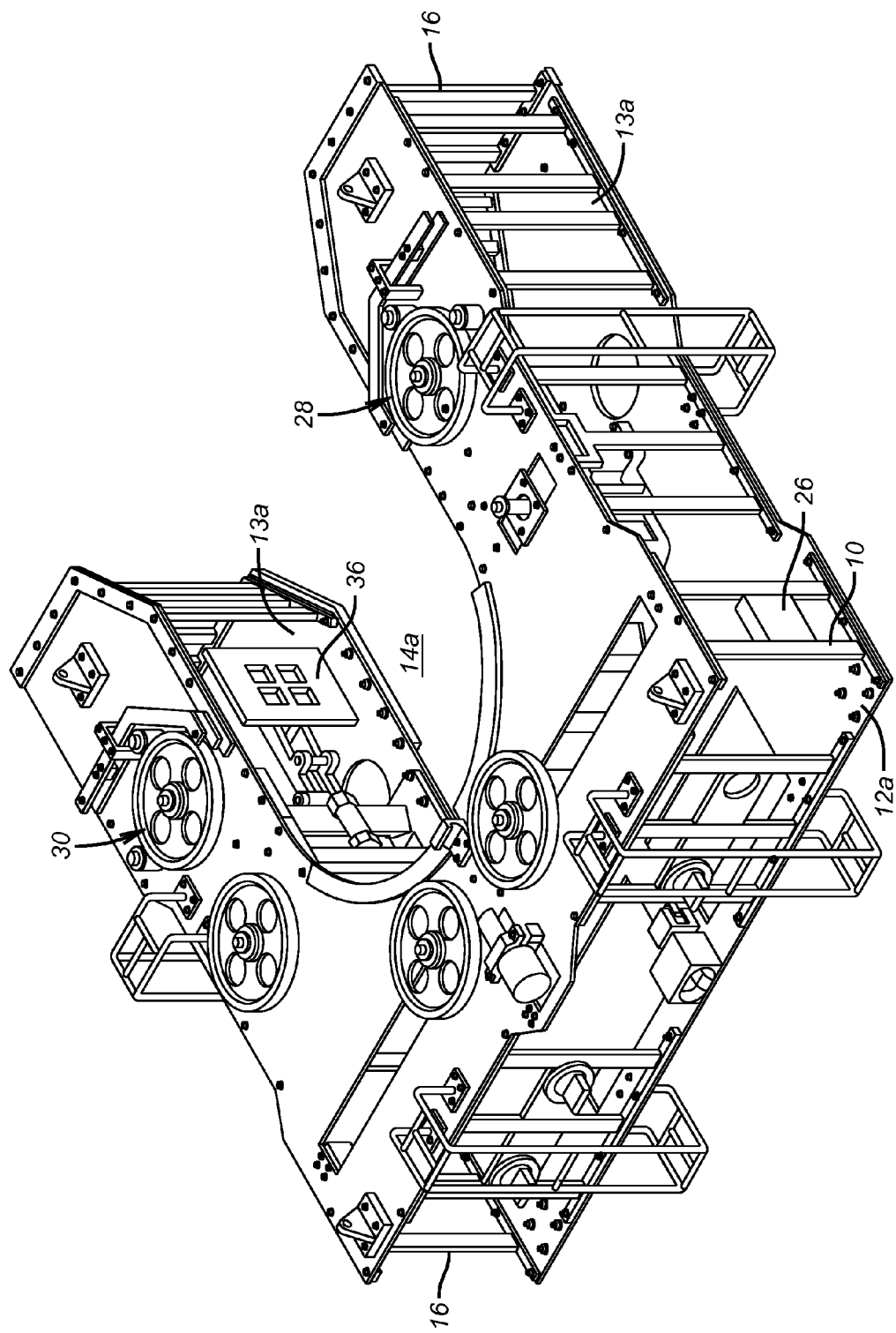
FIG. 3 is an isometric view of an embodiment of the invention.
Figure 4:
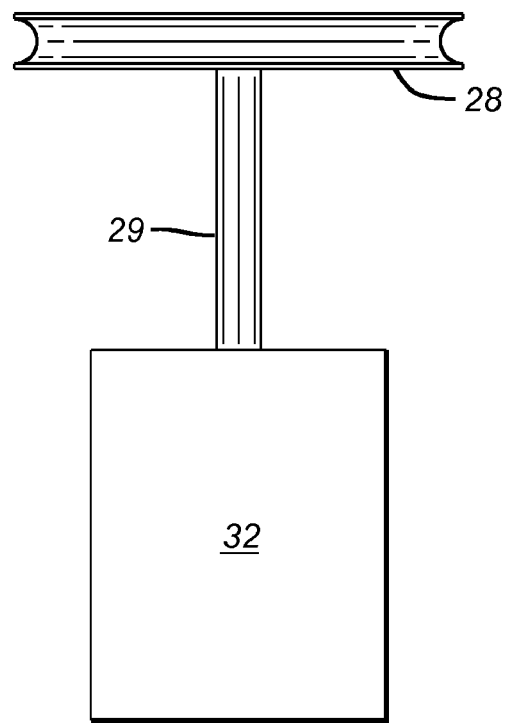
FIG. 4 is a side view of an embodiment of a first drive wheel, first drive wheel axle, and first drive wheel motor disclosed herein.
Figure 5:
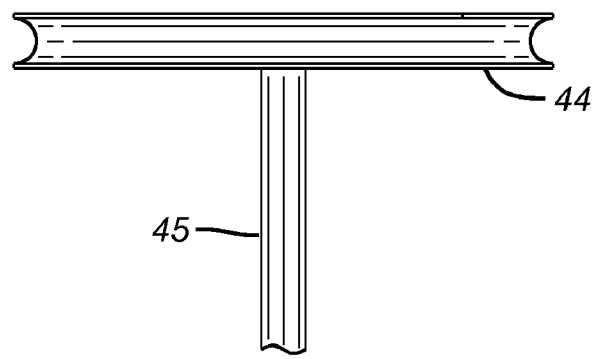
FIG. 5 is a side view of an embodiment of a first pulley and first pulley axle disclosed herein.

In another preferred embodiment, the frame further comprises a buoyant member 26, as shown in FIG. 3. In a preferred embodiment, the buoyant member is foam.

As shown in FIGS. 1a-1c, 3, and 4, a first preferred embodiment of the invention further comprises a first drive wheel 28 coupled to a first drive wheel axle 29 rotatably mounted in the first drive wheel axle opening. A first preferred embodiment of the invention further comprises a second drive wheel 30 coupled to a second drive wheel axle rotatably mounted in the second drive wheel axle opening. The structure and connection of the second drive wheel, second drive wheel axle and second drive wheel motor are the same as that shown in FIG. 4 for the first drive wheel, first drive wheel axle and first drive wheel motor.

A first preferred embodiment of the invention further comprises a first drive wheel motor 32 attached to the frame and operatively coupled to the first drive wheel axle. A first preferred embodiment of the invention further comprises a second drive wheel motor attached to the frame and operatively coupled to the second drive wheel axle.

Figure 6:
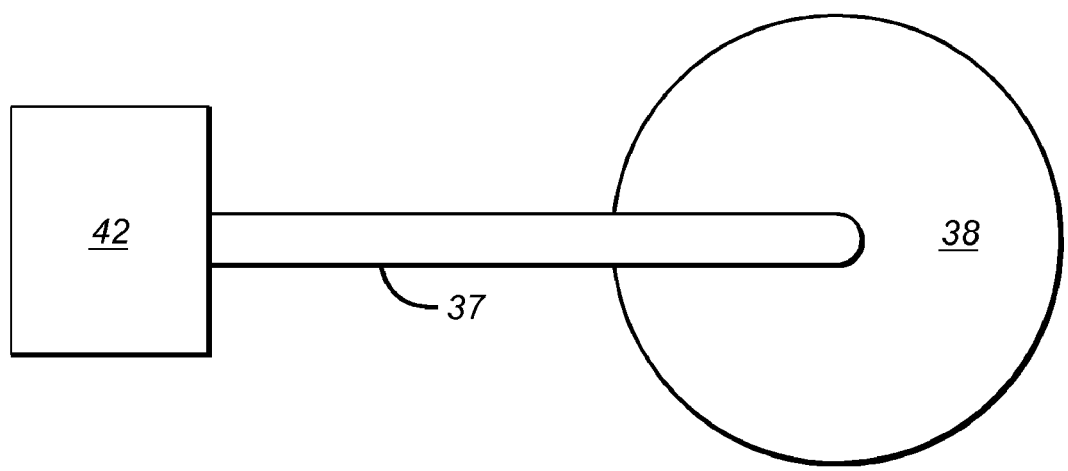
FIG. 6 is a side view of an embodiment of a clamping device disclosed herein.
Figure 7:
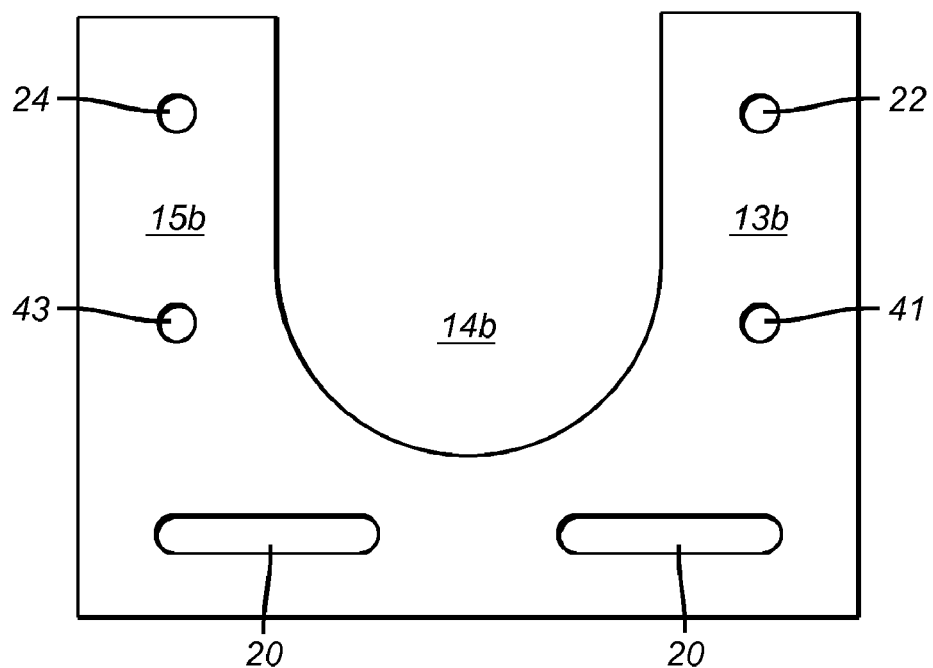
FIG. 7 is a top view of an embodiment of an upper plate disclosed herein.

A first preferred embodiment of the invention further comprises a clamping device 36 attached to the frame and positioned such that it can clamp objects to be cut in a fixed position in the central gripping regions, as shown in FIG. 3. In another preferred embodiment, the clamping device comprises a first clamping arm 37 comprising a first end and a second end opposite the first end, as shown in FIG. 6. In this preferred embodiment, the clamping device further comprises a second clamping arm comprising a first end and a second end opposite the first end. In this preferred embodiment, the clamping device further comprises a first clamping pad 38 attached to the first end of the first clamping arm, and a second clamping pad attached to the first end of the second clamping arm. In this preferred embodiment, the clamping device further comprises a hydraulically powered motor 42 operatively coupled to the second ends of the first and second clamping arms, as shown in FIG. 6. The structure and configuration of the second claiming arm and second clamping pad are the same as that shown in FIG. 6 for the first claiming arm and first clamping pad.

In another preferred embodiment, the clamping device is attached to the frame and positioned such that it can clamp objects to be cut in a fixed position in the central gripping regions. In this embodiment, the clamping device comprises a first clamping arm on one side of the central gripping region and a second clamping arm on the other side of the central gripping region.

As shown in FIGS. 1a-1c, and 5, a first preferred embodiment of the invention further comprises a first pulley 44 comprising a first pulley axle 45 mounted in the first pulley slot 20, and a second pulley 46 comprising a second pulley axle 47 mounted in the second pulley slot 20. The structure and configuration of the second pulley and second pulley axle are the same as that shown in FIG. 5 for the first pulley and first pulley axle.

A first preferred embodiment of the invention further comprises a pulley positioning system attached to the first and second pulleys for varying the separation distance between the first and second pulleys. In another preferred embodiment, the pulley positioning system comprises a threaded translation member 48 operatively coupled to the first and second pulley axles such that rotation of the translation member is a first direction causes the separation distance between the first and second pulleys to increase, and rotation of the translation member in a second direction opposite the first direction, causes the separation distance between the first and second pulleys to decrease. In this preferred embodiment, the pulley positioning system further comprises a hydraulically driven motor 50 operatively coupled to the translation member, such that the motor can cause rotation of the translation member in the first direction or in the second direction. In another preferred embodiment, the pulley positioning system comprises a threaded drive rod 48 coupled to the first and second pulleys for varying the separation distance between the first and second pulleys.

Figure 8:
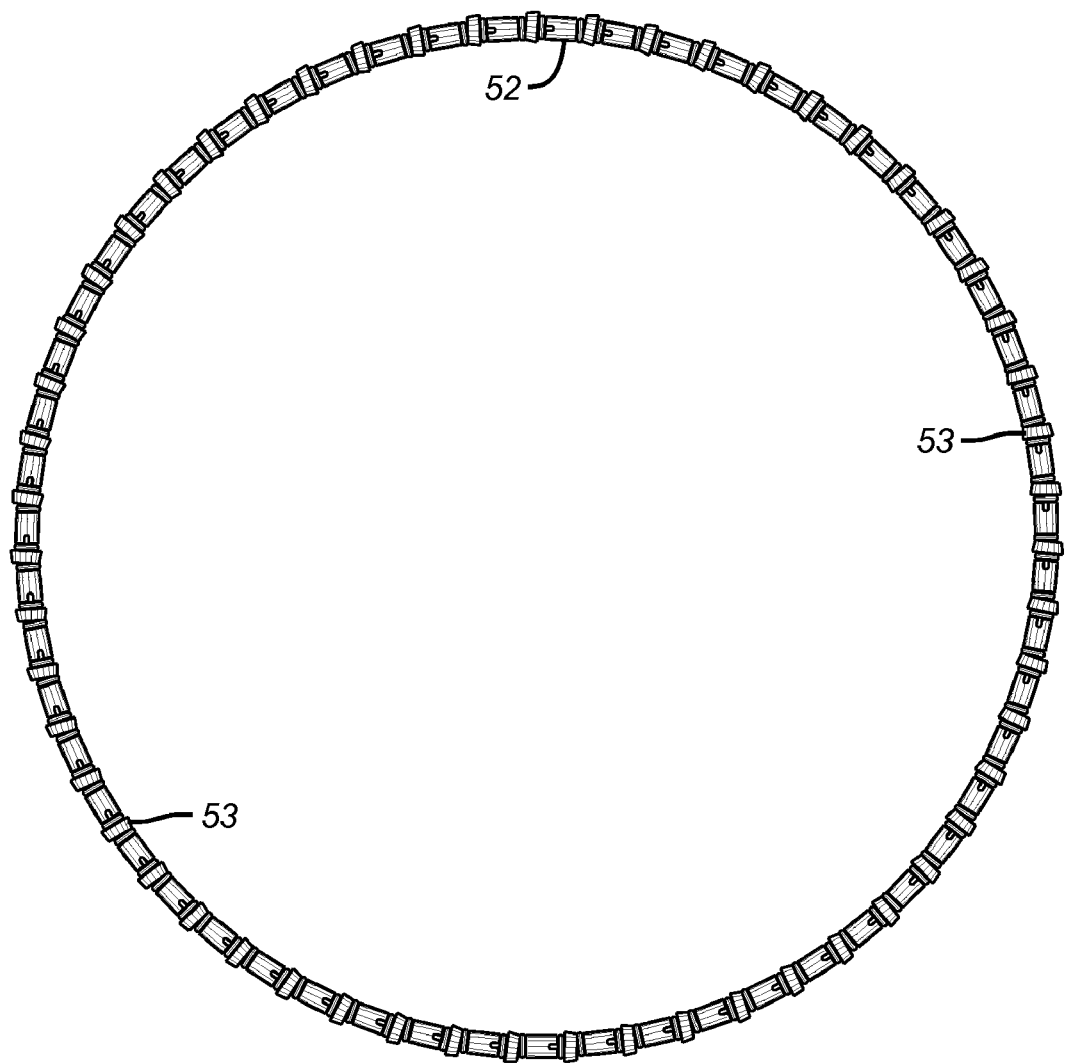
FIG. 8 is a top view of an embodiment of the loop wire cutting blade disclosed herein.

In another preferred embodiment, the invention further comprises a continuous loop wire cutting blade 52 extending around the outer periphery of the first and second pulleys and the first and second drive wheels, as shown in FIGS. 1*a*-1*c*, and 8. In another preferred embodiment, the invention further comprises tungsten carbide cutting elements 53. In another preferred embodiment, the cutting blade comprises a diamond wire, as shown in FIG. 8.

In another preferred embodiment, the invention comprises a first idler wheel axle port 41 in the upper plate right arm, and a second idler wheel axle port 43 in the upper plate left arm, as shown in FIGS. 1*a*-1*c*, 3 and 7. In this preferred embodiment, the invention further comprises a first idler wheel 55 comprising a first idler wheel axle 56 rotatably mounted in the first idler wheel axle port, and a second idler wheel 57 comprising a second idler wheel axle 58 rotatably mounted in the second idler wheel axle port, as shown in FIGS. 1*a*-1*c*, and 3.

In another preferred embodiment, the invention further comprises a continuous loop wire cutting blade extending around the outer periphery of the first and second pulleys and the first and second drive wheels, and further engaging the first and second idler wheels on the sides of the idler wheels facing the upper central gripping region. In this preferred embodiment, the cutting blade comprises tungsten carbide cutting elements.

The foregoing disclosure and description of the inventions are illustrative and explanatory. Various changes in the size, shape, and materials, as well as in the details of the illustrative construction may be made without departing from the spirit of the invention.

What is claimed is:

1. A subsea system for driving a wire loop cutting element, comprising:
   a. a frame comprising a lower plate comprising right and left arms defining a lower central gripping region, said frame further comprising a bracket connected to the lower plate, and an upper plate connected to the bracket, said upper plate comprising two pulley slots, a right arm comprising a first drive wheel axle opening, and a left arm opposite the right arm, comprising a second drive wheel axle opening, said right and left arms defining an upper central gripping region in substantial longitudinal alignment with the lower central gripping region;
   b. a first drive wheel axle rotatably mounted in the first drive wheel axle opening;
   c. a first drive wheel coupled to the first drive wheel axle;
   d. a second drive wheel axle rotatably mounted in the second drive wheel axle opening;
   e. a second drive wheel coupled to the second drive wheel axle;
   f. a first drive wheel motor attached to the frame and operatively coupled to the first drive wheel axle;
   g. a second drive wheel motor attached to the frame and operatively coupled to the second drive wheel axle;
   h. a clamping device attached to the frame and positioned such that it can clamp objects to be cut in a fixed position in the central gripping regions;
   i. a first pulley comprising a first pulley axle mounted in the first pulley slot;
   j. a second pulley comprising a second pulley axle mounted in the second pulley slot; and
   k. a pulley positioning system attached to the first and second pulleys for varying the separation distance between the first and second pulleys.

2. The system of claim 1, wherein the pulley positioning system comprises:
   a. a threaded translation member operatively coupled to the first and second pulley axles such that rotation of the translation member is a first direction causes the separation distance between the first and second pulleys to increase, and rotation of the translation member in a second direction opposite the first direction, causes the separation distance between the first and second pulleys to decrease; and
   b. a hydraulically driven motor operatively coupled to the translation member, such that the motor can cause rotation of the translation member in the first direction or in the second direction.

3. The system of claim 1, wherein the clamping device comprises:
   a. a first clamping arm comprising a first end and a second end opposite the first end;
   b a second clamping arm comprising a first end and a second end opposite the first end;
   c. a first clamping pad attached to the first end of the first clamping arm;
   d. a second clamping pad attached to the first end of the second clamping arm; and
   e. a hydraulically powered motor operatively coupled to the second ends of the first and second clamping arms.

4. The system of claim 1, further comprising a continuous loop wire cutting blade extending around the outer periphery of the first and second pulleys and the first and second drive wheels.

5. The system of claim 4, wherein the cutting blade comprises tungsten carbide cutting elements.

6. The system of claim 4, wherein the cutting blade comprises a diamond wire.

7. The system of claim 1, further comprising:
   a. a first idler wheel axle port in the upper plate right arm;
   b. a second idler wheel axle port in the upper plate left arm;
   c. a first idler wheel comprising a first idler wheel axle rotatably mounted in the first idler wheel axle port; and
   d. a second idler wheel comprising a second idler wheel axle rotatably mounted in the second idler wheel axle port.

8. The system of claim 7, further comprising a continuous loop wire cutting blade extending around the outer periphery of the first and second pulleys and the first and second drive wheels, and further engaging the first and second idler wheels on the sides of the idler wheels facing the upper central gripping region.

9. The system of claim 8, wherein the cutting blade comprises tungsten carbide cutting elements.

10. The system of claim 1, wherein the frame comprises a buoyant member.

11. The system of claim 10, wherein the buoyant member is foam.

12. A subsea system for driving a wire loop cutting element, comprising:
   a. a frame comprising a lower plate comprising right and left arms defining a lower central gripping region, said frame further comprising a bracket connected to the lower plate, and an upper plate connected to the bracket, said upper plate comprising two pulley slots, a right arm comprising a first drive wheel axle opening, and a left arm opposite the right arm, comprising a second drive wheel axle opening, said right and left arms defining an upper central gripping region in substantial longitudinal alignment with the lower central gripping region;
b. a first drive wheel axle rotatably mounted in the first drive wheel axle opening;
c. a first drive wheel coupled to the first drive wheel axle;
d. a second drive wheel axle rotatably mounted in the second drive wheel axle opening;
e. a second drive wheel coupled to the second drive wheel axle;
f. a first drive wheel motor attached to the frame and operatively coupled to the first drive wheel axle;
g. a second drive wheel motor attached to the frame and operatively coupled to the second drive wheel axle;
h. a clamping device attached to the frame and positioned such that it can clamp objects to be cut in a fixed position in the central gripping regions;
i. a first pulley comprising a first pulley axle mounted in the first pulley slot;
j. a second pulley comprising a second pulley axle mounted in the second pulley slot; and
k. a pulley positioning system comprising a threaded drive rod coupled to the first and second pulleys for varying the separation distance between the first and second pulleys.

13. The system of claim 12, further comprising a continuous loop wire cutting blade extending around the outer periphery of the first and second pulleys and the first and second drive wheels.

14. The system of claim 12, wherein the clamping device comprises:
    a. a first clamping arm comprising a first end and a second end opposite the first end;
    b. a second clamping arm comprising a first end and a second end opposite the first end;
    c. a first clamping pad attached to the first end of the first clamping arm;
    d. a second clamping pad attached to the first end of the second clamping arm; and
    e. a hydraulically powered motor operatively coupled to the second ends of the first and second clamping arms.

15. The system of claim 12, further comprising:
    a. a first idler wheel axle port in the upper plate right arm;
    b. a second idler wheel axle port in the upper plate left arm;
    c. a first idler wheel comprising a first idler wheel axle rotatably mounted in the first idler wheel axle port; and
    d. a second idler wheel comprising a second idler wheel axle rotatably mounted in the second idler wheel axle port.

16. The system of claim 15, further comprising a continuous loop wire cutting blade extending around the outer periphery of the first and second pulleys and the first and second drive wheels, and further engaging the first and second idler wheels on the sides of the idler wheels facing the upper central gripping region.

17. A subsea system for driving a wire loop cutting element, comprising:
    a. a frame comprising a lower plate comprising a buoyant member, right and left arms defining a lower central gripping region, said frame further comprising a bracket connected to the lower plate, and an upper plate connected to the bracket, said upper plate comprising two pulley slots, a right arm comprising a first drive wheel axle opening, and a left arm opposite the right arm, comprising a second drive wheel axle opening, said right and left arms defining an upper central gripping region in substantial longitudinal alignment with the lower central gripping region;
    b. a first drive wheel axle rotatably mounted in the first drive wheel axle opening;
    c. a first drive wheel coupled to the first drive wheel axle;
    d. a second drive wheel axle rotatably mounted in the second drive wheel axle opening;
    e. a second drive wheel coupled to the second drive wheel axle;
    f. a first drive wheel motor attached to the frame and operatively coupled to the first drive wheel axle;
    g. a second drive wheel motor attached to the frame and operatively coupled to the second drive wheel axle;
    h. a clamping device attached to the frame and positioned such that it can clamp objects to be cut in a fixed position in the central gripping regions, said clamping device comprising a first clamping arm on one side of the central gripping regions and a second clamping arm on the other side of the central gripping regions;
    i. a first pulley comprising a first pulley axle mounted in the first pulley slot;
    j. a second pulley comprising a second pulley axle mounted in the second pulley slot; and
    k. a pulley positioning system attached to the first and second pulleys for varying the separation distance between the first and second pulleys.

18. The system of claim 17, further comprising a continuous loop wire cutting blade extending around the outer periphery of the first and second pulleys and the first and second drive wheels.

19. The system of claim 17, wherein the pulley positioning system comprises:
    a. a threaded translation member operatively coupled to the first and second pulley axles such that rotation of the translation member is a first direction causes the separation distance between the first and second pulleys to increase, and rotation of the translation member is a second direction opposite the first direction, causes the separation distance between the first and second pulleys to decrease; and
    b. a hydraulically driven motor operatively coupled to the translation member, such that the motor can cause rotation of the translation member in the first direction or in the second direction.

20. The system of claim 17, further comprising:
    a. a first clamping pad attached to the first clamping arm; and
    b. a second clamping pad attached to the second clamping arm.

* * * * *